April 27, 1954

J. S. KAMBORIAN 2,676,345

LASTING APPARATUS

Filed Jan. 3, 1951

Inventor
Jacob S. Kamborian
by Roberts, Cushman & Grover
att'ys.

Patented Apr. 27, 1954

2,676,345

UNITED STATES PATENT OFFICE 2,676,345

LASTING APPARATUS

Jacob S. Kamborian, West Newton, Mass.

Application January 3, 1951, Serial No. 204,245

3 Claims. (Cl. 12—8.3)

This invention relates to lasting apparatus for use in the manufacture of shoes, and more particularly for use in cement lasting the forepart and sides of shoes, although it may be used for lasting the entire shoe.

In my Patent 2,467,385, granted April 19, 1949, there is illustrated a lasting apparatus in which there is a pair of gripper rolls arranged to grip the lasting margin, stress it substantially perpendicular to the bottom structure of the shoe, and then release it to rapidly reciprocating wiper blades arranged close to the gripper rolls which operate on successive small areas of the released lasting margin to wipe them inwardly over the bottom structure of the shoe. A nozzle or equivalent device is situated between the gripper rolls and wipers in a position to inject a quantity of adhesive into the closing space between the marginal portion of the bottom structure and the under side of the upper material so that the lasting margin will adhere to the bottom following the wiping operation. The adhesive used is of the plastic and/or thermoadhesive kind and a considerable amount of the adhesive becomes attached to the wipers during the wiping operation. Because of their rapid reciprocation, considerable frictional heat is developed so that the wipers are quite hot and hence the adhesive picked up thereby remains gummy and sticky. The adhesive accumulates rapidly enough to make it necessary to stop work frequently to clean the wipers. The principal objects of this invention are to provide for automatically cleaning the wipers of adhesive in such a manner that the machine need not be stopped to remove the accumulated adhesive. Further objects are to provide means for removing the adhesive which will not require modification of the machine structure and/or auxiliary tools or implements. Still further objects are to provide means which is inexpensive to apply to the machine and to maintain in working order and is effective in operation.

In order to keep the wiping means clean of adhesive, or at least to cause the adhesive deposited thereon or accumulated thereby to flake off as fast as it accumulates, the wiping means is cooled to a temperature substantially below the temperature at which the adhesive sets. Cooling the adhesive embrittles it so that it flanks, chips and/or is knocked off the wiper means during the wiping operation, due to the harsh rubbing of the wipers over the upper material and the bottom structure of the shoe. As herein illustrated, the cooling is effected by dropping or spraying a cooling fluid on the wiper means during operation thereof, such as water, or any other liquid which will evaporate with sufficient rapidity to impart the desired amount of cooling. Alternatively, a stream of cold air may be projected onto the upper means or they may be surrounded by cooling means such as a coil.

The invention will now be described in greater detail with reference to the accompanying drawings wherein.

Figure 1:
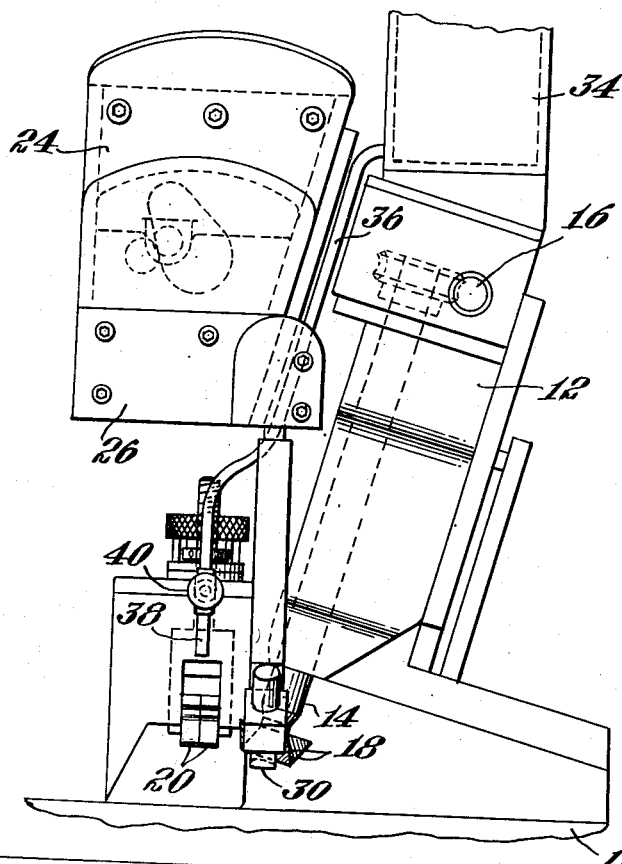
Fig. 1 is a fragmentary front elevation of operating parts of the lasting machine showing the cooling device attached thereto.

Referring to Fig. 1, the machine, which is very similar in many aspects to that shown in the aforementioned patent, and also to my pending application Ser. No. 169,331, filed June 21, 1950, now Patent No. 2,607,936 granted August 26, 1952, has a pedestal 10 and head frame 12 at the upper end thereof for supporting the operating instrumentalities, the head frame 12, as illustrated in Fig. 1, being inclined toward the right. Journaled in the head frame 12 are a pair of parallel shafts 14—14 which extend upwardly therethrough and are operably connected by suitable gearing to a horizontally arranged shaft 16 also journaled in the head frame. The rear end of the shaft 16 has on it a pulley (not shown) by which it is driven, and rotation of the shaft 16 effects rotation of the shafts 14 in opposite directions. At the lower ends of the shafts 14 there are fixed a pair of frusto-conical gripper rolls 18—18 for engaging the lasting margin of the shoe and stressing the upper material over the last. After stressing of the marginal edge of the upper, it is released by the aforesaid gripping rolls to a pair of rapidly reciprocating wiper blades 20—20 mounted for reciprocation in a vertically adjustable wiper supporting head 22. Adjustment of the wiper head and reciprocation of the wipers in seriatim is clearly illustrated in the aforesaid application and is evident herein without further explanation.

Adhesive is employed with this lasting apparatus for sticking the stressed marginal portion of the upper to the bottom structure after it is wiped into engagement with the bottom by the aforesaid wipers. A thermoadhesive and/or thermoplastic adhesive is employed and the liquid adhesive is supplied hot from a container 24 mounted above the wipers and gripper rolls on a suitable bracket 26 bolted to the frame. The liquid adhesive flows by gravity from the container 24 through a pipe 28 to a nozzle 30 situated close to the gripper rolls at the side adjacent to the wipers. The nozzle is of comparatively flat construction so that as the shoe is turned during the stressing and wiping operations, the nozzle will slide along the bottom structure of the shoe and discharge the liquid adhesive between the marginal edge of the bottom and the under surface of the folded-over margin. A valve 32 is employed for controlling the flow of adhesive.

Some of the adhesive used, even with close adjustment of the flow from the nozzle 30, is bound to be squeezed from beneath the wiped-over lasting margin as the wipers press it against the bottom structure of the shoe, and hence the wipers pick up a considerable quantity of adhesive which remains sticky and tacky because the wipers themselves are quite hot, due to their rapid reciprocation and the frictional heat generated by their rubbing action with the lasting margin. The accumulation of adhesive on the wipers not only impedes their proper operation, but applies part of the adhesive to the exposed surface of the wiped-in margin of the upper, which is undesirable and unsightly. Moreover, the sticky wipers tend to pick up a considerable amount of dirt which is eventually transferred to the shoe. In accordance with the present invention, to avoid this accumulation of soft tacky adhesive, the wipers are cooled to a temperature substantially below the temperature at which the adhesive solidifies. When the wipers are maintained at a temperature below the point at which the adhesive solidifies, the latter hardens on the wiper blades and becomes brittle and will then fracture and flake off of the blades due to their harsh rubbing action over the upper material, thus automatically ridding themselves of the adhesive which falls to the floor. To effect the desired cooling, and as illustrated herein, there is mounted on the head frame 12 a container 34 from which extends a pipe 36, one end of which is connected to the bottom of the container. The lower end 38 terminates directly above the wipers, providing a drip from which liquid in the container 34 may gravitate and drop from the end of the pipe onto the reciprocating wipers. A valve 40 is placed in the pipe close to its end 38 for controlling the flow of liquid.

The cooling liquid is generally water, however, other suitable liquids might be employed such as alcohol, which, because of its rapid evaporation, would effect a high degree of cooling.

Figure 2:
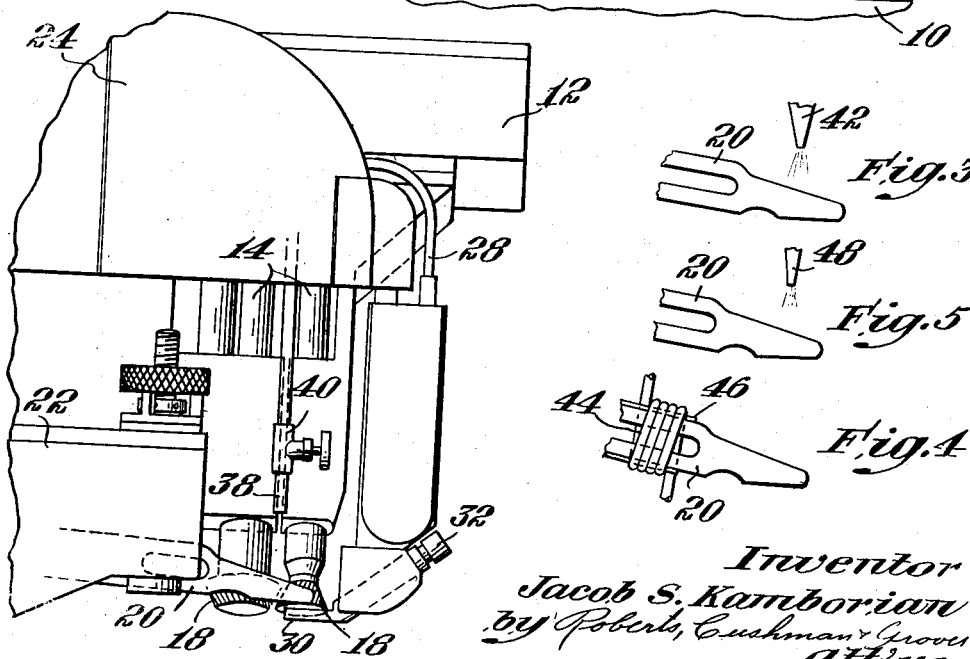
Fig. 2 is a side elevation to larger scale showing the relation of the cooling device, grippers, wipers and cement applying nozzle.
Figure 3:
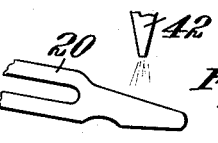
Fig. 3 shows the use of a nozzle for spraying cooling liquid on the wipers.

While a straight drip pipe is illustrated in Figs. 1 and 2 for conducting the cooling fluid from the container to the wipers, it is within the scope of the invention to use a spray nozzle 42 (Fig. 3) and to project the water from the spray nozzle under some pressure into contact with the wiper blades. Such a nozzle will have to have a rather fine control so as to confine the spray to a narrow area.

Figure 5:
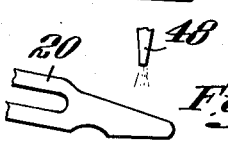
Fig. 5 shows a nozzle for ejecting a stream of cooling vapor or air on the wipers.
Figure 4:
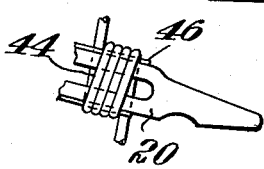
Fig. 4 shows a refrigerating coil for cooling the wipers by conduction.

Cooling may alternately be effected by conduction, for example by wrapping the rear ends of the blades with coils 44 (Fig. 4) containing a refrigerating liquid so that cold from these coils lowers the temperature of the blades by abstracting heat therefrom in sufficient quantity to cool the blades to the desired low temperature. Such coils might be readily wrapped about a stationary sleeve 46 within which the blades would reciprocate. It is still further contemplated that a jet of cold vapor such as compressed carbon dioxide or air might be blown from a nozzle 48 (Fig. 5) upon the wiper blades.

It should be understood that the present disclosure is for the purpose of illustration only and that this invention includes all modifications and equivalents which fall within the scope of the appended claims.

I claim:

1. In a machine for cement lasting upper material over the bottom structure of a shoe, means for stressing successive small areas of the lasting margin substantially perpendicular to the bottom and releasing them, reciprocating wipers for pressing said successive small areas of the margin into contact with the bottom following release from the first-named means, means for supplying a thermoplastic adhesive to the margin of the bottom beneath the lasting margin of the upper, and means arranged above the reciprocating wipers intermittently to drop a cooling fluid on the wipers.

2. In a machine for cement lasting upper material over the bottom structure of a shoe, means for stressing successive small areas of the lasting margin substantially perpendicular to the bottom and releasing them, wipers for pressing said successive small areas of the margin into contact with the bottom following release from the first-named means, means for supplying a thermoplastic adhesive to the margin of the bottom beneath the lasting margin of the upper, and a drip pipe situated above the wipers and in the path of movement thereof from which drips a cooling fluid.

3. In a machine for cement lasting upper material over the bottom structure of a shoe, means for stressing successive small areas of the lasting margin substantially perpendicular to the bottom and releasing them, wipers for pressing said successive small areas of the margin into contact with the bottom following release from the first-named means, means for supplying a thermoplastic adhesive to the margin of the bottom beneath the lasting margin of the upper, a drip pipe situated above the wipers and in the path of movement thereof from which drops of cooling fluid fall onto the wipers, and means for supplying fluid to the drip pipe.

References Cited in the file of this patent

UNITED STATES PATENTS

| Number | Name | Date |
| --- | --- | --- |
| 1,661,572 | MacDonald | Mar. 6, 1928 |
| 2,429,306 | Carr | Oct. 21, 1947 |
| 2,467,385 | Kamborian | Apr. 19, 1949 |
| 2,474,307 | Fossa | June 28, 1949 |